W. H. WHITTEMORE.
LINEMAN'S TOOL.
APPLICATION FILED APR. 29, 1908.
972,305.
Patented Oct. 11, 1910.
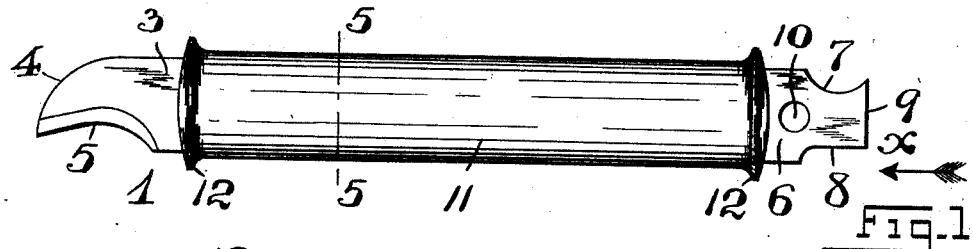
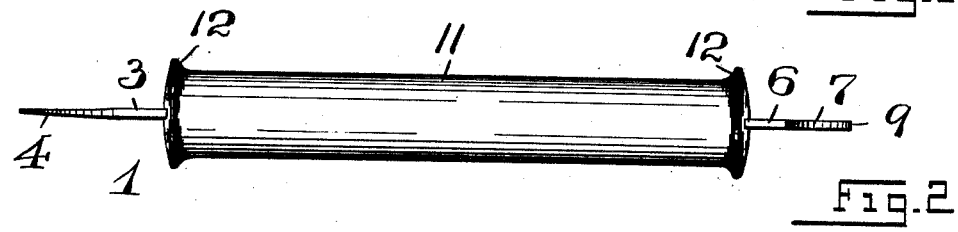
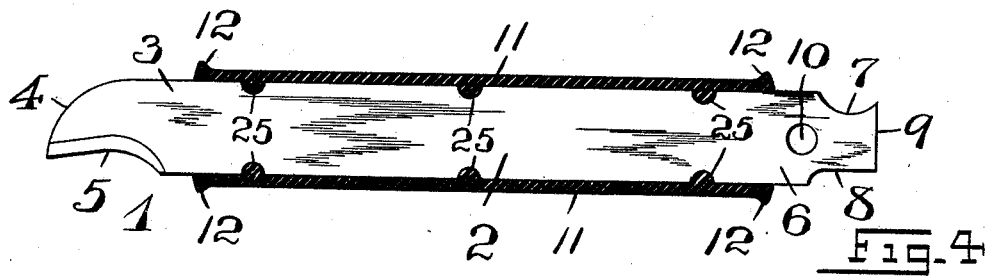
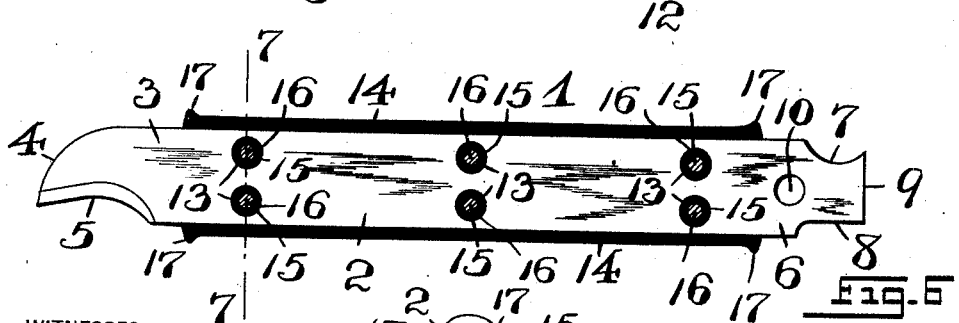
WITNESSES:
INVENTOR:
William H. Whittemore,
BY
Fraentzel and Richards,
ATTORNEYS

UNITED STATES PATENT OFFICE.

WILLIAM H. WHITTEMORE, OF EAST ORANGE, NEW JERSEY, ASSIGNOR TO STRIEBY & FOOTE COMPANY, A CORPORATION OF NEW JERSEY.

LINEMAN'S TOOL.

972,305. Specification of Letters Patent. Patented Oct. 11, 1910.

Application filed April 29, 1908. Serial No. 429,940.

*To all whom it may concern:*

Be it known that I, WILLIAM H. WHITTEMORE, a citizen of the United States, residing at East Orange, in the county of Essex and State of New Jersey, have invented certain new and useful Improvements in Linemen's Tools; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in cutting tools; and, the invention relates, more particularly, to a novel tool which is especially adapted to the uses of line-men, telegraphers, electricians, and men working at similar professions.

The invention has for its principal object to provide a tool for cutting the insulation upon wire, for the scraping off of the insulation, for cleaning and brightening metal surfaces for making electrical contacts, and for performing similar and other operations occurring in the every-day work of the electrician, line-man, or the like.

A further object of the present invention is to provide a novel tool of the character herein set forth, which may be used and handled upon "dead" or "live" electric wires with perfect safety, and which is so constructed that accidental touching of "live" wires with the tool, while holding it in the hand, will not cause any danger or electric shock to the user of the tool.

The invention consists, primarily, in the novel lineman's tool provided with a handle-portion perfectly insulated from the metal parts of the tool, in the manner hereinafter set forth; and, this invention consists, furthermore, in the novel arrangements and combinations of the parts of the tool, as well as in the details of the construction of the same, all of which will be more fully described in the following specification, and then finally embodied in the clauses of the claims, which are appended to this specification and which form an essential part of the same.

The invention is clearly illustrated in the accompanying drawings, in which:—

Figure 1 is a side elevation of the novel tool embodying the principles of the present invention; Fig. 2 is an edge elevation of the same; and Fig. 3 is an end elevation of the tool, looking in the direction of the arrow *x*. Fig. 4 is a longitudinal vertical section of the handle-portion of the tool, with the blade of the same shown in elevation; and Fig. 5 is a vertical cross-section of the same, taken on line 5—5 in said Fig. 1. Fig. 6 is a longitudinal vertical section similar to that shown in Fig. 4, of a slightly modified form of lineman's tool embodying the principles of the present invention; and Fig. 7 is a vertical cross-section of the same, said section being taken on line 7—7 in said Fig. 6.

Similar characters of reference are employed in all of the above described views, to indicate corresponding parts.

Referring now to the several figures of the said drawings, the reference-character 1 indicates the complete tool embodying the principles of the present invention, the same comprising a metallic blade or tool-member consisting of a main body-portion 2 which is provided at one end with a cutter-portion 3. This portion is preferably bounded by a rounded marginal edge or end 4, and cutting-edge 5, which is preferably of a concave curvature, substantially as shown, said rounded edge 4 being also adapted to serve as a scraping edge. At its opposite end, said body 2 is provided with a scraping-portion, having a concave scraping-edge 7 on one side or edge thereof and a straight scraping-edge 8 upon the other side or edge thereof; and, furthermore, having a squared or straight end forming another scraping edge 9, this latter scraping-edge 9 being adapted for the purpose of cleaning, scraping, burnishing or brightening metal surfaces so as to provide good electrical contacts, while the former scraping edges 7 and 8 are more particularly adapted for scraping off insulation from wire or the like, and such similar operations. The said scraping portion or member 6 may be furthermore provided with a suitably located hole or perforation 10, which forms a convenient means of hanging the tool upon a lineman's belt, or in other convenient locations.

The main-body portion 2 of the metallic blade or tool-member is incased, preferably by being molded in one piece thereupon, in a handle-portion or member 11, made of any suitable material which is a non-conductor of electricity, such as hard-rubber, insulating fiber, or any suitable material. Each end of this handle-portion may be provided with slightly flanged ends, as 12, which guard against the accidental slipping of the tool through the hand of the user and thereby causing any accidental contact with the metal of the tool-member or wire or other material upon which it is being used; but it will be understood that the flanges 12 may be dispensed with, if desired.

Referring now more particularly to Figs. 6 and 7 of the drawings, in which I have shown a slightly modified form of tool embodying the principles of this invention, there is shown therein a tool-member of the same construction as above described except that the main body-portion 2 thereof is provided at suitable locations with perforations 13. Secured to this said body-portion 2 is a handle-portion 14 composed of two separable sections or halves, said sections being made of material which is a non-conductor of electricity, such as hard-rubber, insulating fiber, or any similar material. Each section of this said handle-portion 14 is provided upon its inner face with a groove or channel adapted to conform with the contour of the main body-portion 2 of the tool-member, so as to receive the same. Each half of the said handle-portion 14 is also provided with bosses or raised portions 15 upon the inner sides of the same, said bosses or raised portions 15 being adapted to penetrate and fit in the holes or perforations 13 of the main body-portion 2 of the said tool-member when the said two sections or halves of the handle-portion 14 are placed upon the opposite sides of the body-portion 2. The bosses or raised portions 15 upon the opposite halves of the handle-portion 14 are constructed in such a manner, so as to meet and abut each other half way through the thickness of the main-body portion 2 of the said tool-member, substantially as illustrated in Fig. 7 of the drawings. The bosses or raised portions 15 are pierced or perforated straight through to the outside of each half of the handle-portion 14 and a pin or rivet 16 being passed through said bosses joins the two sections or halves of the handle-portion 14 together and thus secures said handle-portions 14 directly upon the main body 3 of the blade or tool-member, so that when the metallic pins or rivets 16 are used, the hand of the user of the tool is perfectly insulated from contact with the metallic tool-member, while using the tool. Each half of the handle-portion 14 may be provided at each end with a slightly flanged portion 17, which prevents the accidental slipping of the hand of the user of the tool from the said handle-portion 14, for the purposes previously stated.

To guard against any accidental displacement or slipping of the blade-member within the casing which is formed by the insulating handle-portion, the metallic blade-member may be provided in its marginal edge-portions with suitable recesses or serrations, as 25 in Fig. 4, into which the insulating material during the process of making the handle-portion is flowed or pressed, and caused to harden therein, so that there can be no movement between the parts.

I am aware that changes may be made in the various arrangements and combinations of parts as well as in the details of the construction of the same, without departing from the scope of my present invention, as defined in the appended claims. Hence, I do not limit my invention to the exact arrangements and combinations of the devices and parts, as illustrated in the accompanying drawings, and as described in the accompanying specification, nor do I confine myself to the exact details of the constructions of the said parts.

I claim:—

1. A lineman's cutting tool comprising a flat metal body, said body being provided at one end with a short portion formed with a convex scraping edge and a concave cutting edge, and said body being provided at its other end with a short portion formed with a multiplicity of scraping edges, and a handle-portion surrounding the entire flat metal body except the short end-portions thereof, the said handle-portion being made from a non-metallic material which is a non-conductor of electricity, the said handle-portion being provided at its end with marginal flanges which form safety-guards, and the said combined scraping and cutting edge-portion extending only a short distance beyond the end of the handle-portion so as to provide rigidity of said scraping and cutting edge-portion.

2. As a new article of manufacture, a lineman's tool comprising a metallic tool-member, provided at one end with a cutting-member, and provided at the opposite end with a scraping-member, and a handle-member made of material which is a non-conductor of electricity secured upon said metallic tool-member between the said cutting-member and the scraping member thereof, substantially as and for the purposes set forth.

3. As a new article of manufacture, a lineman's tool comprising a metallic tool-member, provided at one end with a cutting-member, and provided at the opposite end with a scraping-member, and a handle-member made of material which is a non-conductor of electricity secured upon said metallic tool-member between the said cutting-member and the scraping member thereof, said handle-member being provided at each end with slightly flanged portions, substantially as and for the purposes set forth.

4. As a new article of manufacture, a lineman's tool comprising a metallic tool-member provided at one end with a cutting-member, having a rounded end and a concave cutting-edge, and provided at the opposite end with a scraping-member having a concave scraping-edge upon one side, a straight scraping-edge upon the other side and a straight scraping edge upon its end, a handle-member made of material which is a non-conductor of electricity secured upon said metallic tool-member between the said cutting-member and the said scraping-member thereof, so as to insulate the hand of the user of the tool from electrical contact with the metallic tool-member when in use, substantially as and for the purposes set forth.

5. As a new article of manufacture, a lineman's tool comprising a metallic tool-member provided at one end with a cutting-member, having a rounded end and a concave cutting-edge, and provided at the opposite end with a scraping-member having a concave scraping-edge upon one side, a straight scraping-edge upon the other side and a straight scraping edge upon its end, and a handle-member made of material which is a non-conductor of electricity secured upon said metallic tool-member between the said cutting-member and the said scraping-member thereof, so as to insulate the hand of the user of the tool from electrical contact with the metallic tool-member when in use, said handle-member being provided at each end with slightly flanged portions, substantially as and for the purposes set forth.

6. As a new article of manufacture, a lineman's tool comprising a metallic main-body portion, said main body-portion being provided at one end with a cutting-member and at the other end with a scraping member, said scraping member being provided with a hole, and a handle-member made of material which is a non-conductor of electricity secured upon said main-body portion, substantially as and for the purposes set forth.

7. As a new article of manufacture, a lineman's tool comprising a metallic main-body portion, said main body-portion being provided at one end with a cutting-member and at the other end with a scraping member, said scraping member being provided with a hole, and a handle-member made of material which is a non-conductor of electricity secured upon said main-body portion, said handle-member being provided at each end with slightly flanged portions, substantially as and for the purposes set forth.

8. As a new article of manufacture, a lineman's tool comprising a metallic main-body portion, said main body-portion being provided at one end with a cutting-member having a rounded end and a concave cutting-edge, and at the other end with a scraping-member, said scraping member being provided with a hole, said scraping-member having a concave scraping edge upon one side, a straight scraping-edge upon the other side, and a straight scraping-edge upon its end, and a handle-member, made of material which is a non-conductor of electricity secured upon said main-body portion, so as to insulate the hand of the user of the tool from electrical contact with the metallic portions of the tool when in use, substantially as and for the purposes set forth.

9. As a new article of manufacture, a lineman's tool comprising a metallic main-body portion, said main body-portion being provided at one end with a cutting-member having a rounded end and a concave cutting-edge, and at the other end with a scraping-member, said scraping member being provided with a hole, said scraping-member having a concave scraping edge upon one side, a straight scraping-edge upon the other side, and a straight scraping-edge upon its end, and a handle-member, made of material which is a non-conductor of electricity secured upon said main-body portion, so as to insulate the hand of the user of the tool from electrical contact with the metallic portions of the tool when in use, said handle member being provided at each end with slightly flanged portions, substantially as and for the purposes set forth.

In testimony, that I claim the invention set forth above I have hereunto set my hand this 24th day of April, 1908.

WILLIAM H. WHITTEMORE.

Witnesses:
 FREDK. C. FRAENTZEL,
 GEO. D. RICHARDS.